(12) United States Patent
Sinyard et al.

(10) Patent No.: US 6,848,701 B2
(45) Date of Patent: Feb. 1, 2005

(54) BICYCLE SEAT POST ASSEMBLY

(75) Inventors: Michael Sinyard, Morgan Hill, CA (US); Bradley L. Waldron, San Jose, CA (US); Christopher P. D'Aluisio, Watsonville, CA (US); Kevin Nelson, Mountain View, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 10/195,831

(22) Filed: Jul. 12, 2002

(65) Prior Publication Data

US 2004/0007847 A1 Jan. 15, 2004

(51) Int. Cl.$^7$ ................................................ B62K 1/00
(52) U.S. Cl. .................................... 280/283; 280/281.1
(58) Field of Search ................................. 280/274, 275, 280/281.1, 283; 248/631, 644; 267/131, 132; 297/199

(56) References Cited

U.S. PATENT DOCUMENTS

| | | | | |
|---|---|---|---|---|
| 3,989,263 A | * | 11/1976 | Stuck et al. ................. 280/283 |
| 4,455,010 A | * | 6/1984 | Butler ........................ 248/576 |
| 4,856,801 A | | 8/1989 | Hollingsworth |
| 5,324,058 A | * | 6/1994 | Massaro ..................... 280/283 |
| 5,460,357 A | * | 10/1995 | Stewart ...................... 267/294 |
| 5,609,349 A | | 3/1997 | Buckmiller et al. |
| 5,657,958 A | * | 8/1997 | McLaughlin et al. ....... 248/632 |
| 5,704,626 A | * | 1/1998 | Kesinger .................... 280/220 |
| 6,036,164 A | * | 3/2000 | Martins ...................... 248/600 |
| 6,070,895 A | * | 6/2000 | Newman et al. ........... 280/283 |
| 6,206,396 B1 | | 3/2001 | Smith |
| 6,364,292 B1 | | 4/2002 | Chen et al. |

FOREIGN PATENT DOCUMENTS

EP       0 528 069 A2      2/1993

* cited by examiner

Primary Examiner—Lesley D. Morris
Assistant Examiner—L. Lum
(74) Attorney, Agent, or Firm—Knobbe Martens Olson & Bear LLP

(57) ABSTRACT

A seat post assembly for a bicycle arranged to reduce vibrations that originate at either the front or rear wheel of the bicycle and are transmitted to the rider of the bicycle through the frame. Desirably, the seat post assembly is configured to be supported by a bicycle frame and is configured to support a bicycle seat on its upper end. Preferably, an upper portion of the seat post defines a cavity. A damping member comprised of a vibration damping material is positioned within the cavity. Preferably, the cavity passes completely through the seat post in a lateral direction and the damping member is retained within the cavity by a friction fit therebetween.

32 Claims, 4 Drawing Sheets

BICYCLE SEAT POST ASSEMBLY

BACKGROUND OF THE INVENTION

1. Field of the Invention

The present invention generally relates to bicycles. More particularly, the present invention relates to a bicycle seat post assembly configured to reduce vibrations transmitted to a rider of the bicycle.

2. Description of the Related Art

Bicycle riding and racing often takes place on less than ideal terrain conditions. For example, bicycle touring and racing may often take place on country roads, which may be unpaved or where the pavement may be rough and irregular, even when new. In more populated areas, a significant portion of paved roads may be damaged and in need of repair. When traversed by the bicycle, these irregular surfaces transmit vibrations to the bicycle. Furthermore, the surface of even relatively new pavement, while acceptable for motor vehicles, may be rough enough to transmit significant vibration to a bicycle. Accordingly, most bicyclists spend at least a significant portion of their riding time traversing rough or irregular surfaces. Vibrations induced by such terrain, if not sufficiently dampened, may be transmitted to the rider of the bicycle. When transmitted to the rider, these vibrations often cause discomfort and fatigue.

Several methods for damping terrain-induced vibrations have been utilized. For example, the bicycle may be equipped with front and/or rear suspension assemblies, which permit the suspended wheel to move against a biasing force relative to the bicycle frame. Although highly favored in some applications, such as bicycles intended primarily for off-road use, such suspension assemblies have generally been unsuccessful in connection with bicycles primarily intended for use on paved surfaces (i.e., road bicycles), where low weight and aerodynamics are considered highly important. Furthermore, such suspension assemblies are intended to absorb large bumps and may not be effective at isolating vibrations due to inherent friction within the assembly, which may prevent movement of the suspension assembly in response to small forces.

In road bicycle applications, it has recently become popular to utilize materials having improved damping properties in comparison to metals to form a portion of the bicycle between the wheels and the rider. For example, a composite material of carbon fiber fabric within a resin matrix ("carbon fiber") is often used in an attempt to isolate road-induced vibrations from the rider of the bicycle. In some instances, the entire frame of the bicycle may be comprised of a carbon fiber material. However, due to the high manufacturing costs associated with molding carbon fiber, such bicycle frames are expensive to manufacture. Another common method is to produce the main frame of a more conventional material, such as steel, aluminum or titanium, and provide smaller component parts of carbon fiber material in an attempt to reduce vibration. For example, the front fork, seat post, handlebars, and stay portions of the frame (i.e., seat stays and/or chain stays) may be produced from a carbon fiber material.

Such an arrangement has been more successful in isolating terrain-induced vibrations from reaching the rider of the bicycle in comparison with bicycle frames and components comprised entirely of metal. However, although carbon fiber is lightweight and exhibits improved vibration damping characteristics in comparison to metal, a significant amount of vibration may nonetheless be transferred through components made from carbon fiber.

One proposed solution to carbon fibers undesirable transmission of vibrations is to incorporate an additional material into the carbon fiber fabric that is used to make the final carbon fiber product. For example, a weave of titanium filaments has been incorporated into carbon fiber fabric in an attempt to reduce the amount of vibration that is transmitted through components made of carbon fiber. However, such a solution necessitates a complex manufacturing process and, thus, increases the cost of the final product.

SUMMARY OF THE INVENTION

Accordingly, a need exists for a cost-effective method of reducing vibrations from being transmitted from the wheels of a bicycle to the rider of the bicycle. Preferred embodiments of the seat post assembly are constructed from a carbon fiber material and includes a cut-out portion, which defines a cavity for receiving a separate vibration damping member. Preferably, the vibration damping member is constructed from a viscoelastomeric material and is retained with a friction fit within the cavity.

A preferred embodiment is a bicycle seat post assembly including a seat clamp portion and an elongate, tubular seat post portion. The seat post portion supports the seat clamp portion on its upper end. The post portion has a lower portion, an upper portion and an intermediate portion. The lower portion is configured to be secured to a bicycle frame. A wall of the seat post portion defines an outer wall portion and an internal wall portion. The internal wall portion defines a cavity. A damping member is positioned within the cavity and contacts the internal wall. The damping member comprises a vibration damping material.

A preferred embodiment is a bicycle seat post assembly including a seat clamp portion and an elongate, tubular seat post portion. The seat post portion supports the seat clamp portion on its upper end. The post portion is configured to be secured to a bicycle frame. A wall of the seat post portion defines an outer wall portion and an internal wall portion. The internal wall portion extends from a first side of the outer wall portion to a second side of the outer wall portion opposite the first side and defines a cavity. A damping member is positioned within the cavity and contacts the internal wall. The damping member comprises a vibration damping material.

A preferred embodiment is a bicycle including a frame, a front wheel and a rear wheel connected to the frame. A pedal crank assembly is rotatably supported by the frame and configured to drive the rear wheel. A seat post assembly is secured to the frame and supports a seat on its upper end. The seat post assembly comprises a seat clamp portion and an elongate, tubular seat post portion supporting the seat clamp portion on its upper end. The post portion has a lower portion, an upper portion and an intermediate portion. The lower portion is secured to the frame. A wall of the seat post portion defines an outer wall portion and an internal wall portion. The internal wall portion extends from a first side of the outer wall portion to a second side of the outer wall portion opposite the first side and defines a cavity. A damping member is positioned within the cavity and contacts the internal wall. The damping member comprises a vibration damping material.

BRIEF DESCRIPTION OF THE DRAWINGS

These and other features, aspects and advantages of the present invention are described with reference to drawings of a preferred embodiment, which is intended to illustrate, and not to limit, the present invention. The drawings comprise six figures.

DETAILED DESCRIPTION OF THE PREFERRED EMBODIMENT

Figure 1:
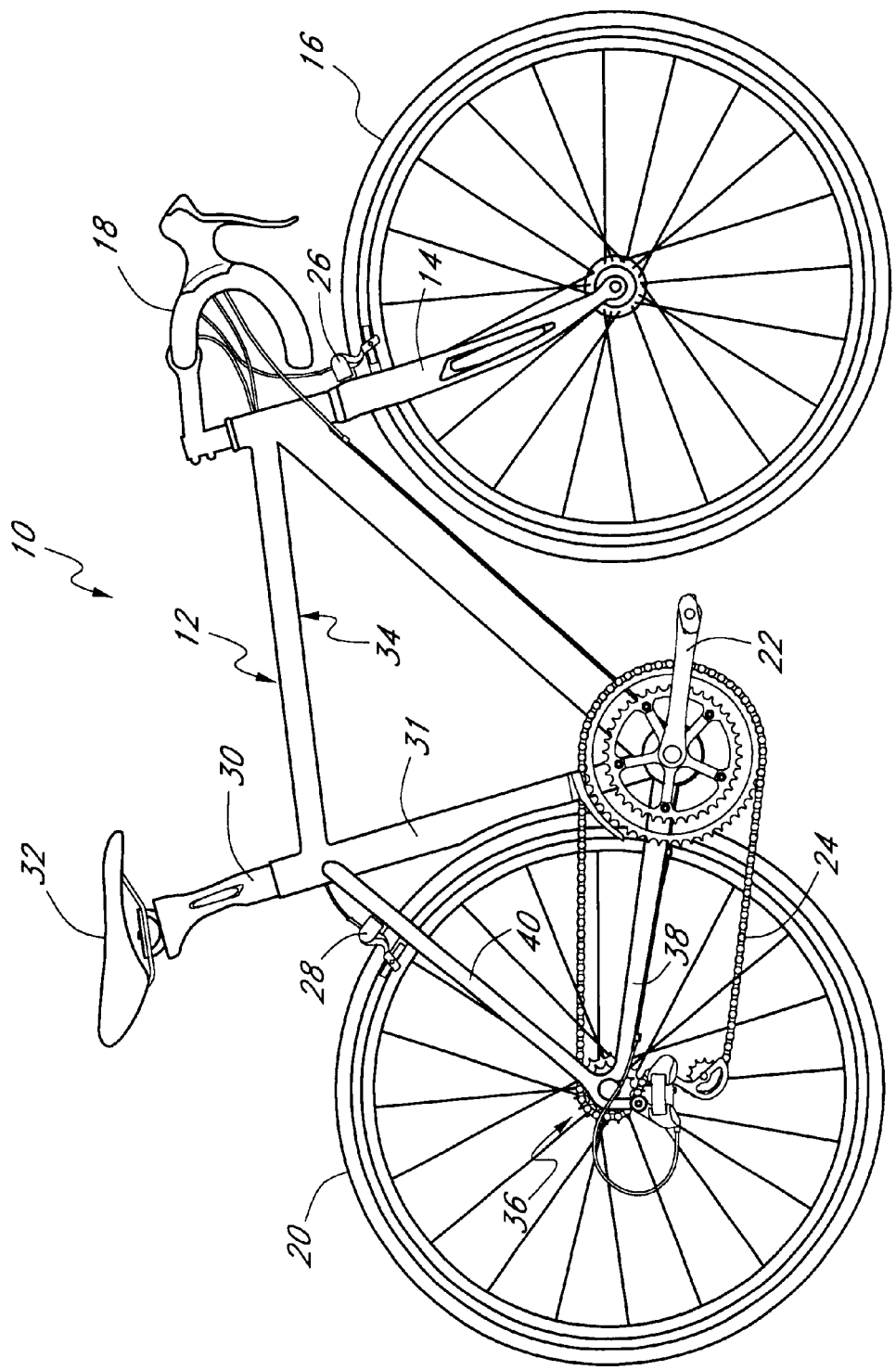
FIG. 1 is a side elevational view of a bicycle incorporating a preferred seat post assembly.

FIG. 1 illustrates a bicycle, which is referred to generally by the reference numeral 10. The bicycle 10 includes a frame 12, which rotatably supports a front fork assembly 14, near a forward end of the frame 12 for rotation about a steering axis. A lower end of the fork assembly 14 supports a front wheel 16 of the bicycle 10. A handlebar assembly 18 is connected to an upper end of the fork 14 for rotating the fork assembly 14 and front wheel 16 about the steering axis of the bicycle 10. In addition, the handlebar assembly 18 may include one or more rider controls, such as shifting or braking controls.

A rear wheel 20 of the bicycle 10 is supported near a rearward end of the frame 12. A pedal crank assembly 22 is rotatably supported by a lower portion of the frame 12. A drive chain 24 extends between the pedal crank assembly and the rear wheel to transfer power therebetween, as is well known in the art.

A front brake caliper 26 is supported by the front fork assembly 14 and is configured to selectively apply a squeezing force to a rim of the front wheel 16. Similarly, a rear brake caliper 28 is supported by the frame 12 and configured to selectively apply a squeezing force to a rim portion of the rear wheel 20. Alternatively, other types of braking systems may also be used.

A preferred embodiment of a seat post assembly 30 extends in an upward direction from the frame 12 and supports a seat 32 on its upper end. Desirably, a lower portion of the seat post assembly 30 is received within a seat tube 31 of the frame 12. The seat post 30 may be inserted into, or retracted from, the seat tube 31 to adjust a seat height of the bicycle 10. The seat post assembly 30 may be secured in a desired position relative to the frame 12 to maintain the seat 32 at a desired height. For example, a seat clamp 33 may be provided to exert a squeezing force on an upper end of the seat tube 31, as is well known in the art. Desirably, the seat post assembly 30 is configured to inhibit vibrations from being transmitted from the bicycle frame 12 to the seat 32 and is described in greater detail below.

Preferably, the frame 12 includes a main frame portion 34 and a wheel support, or rear frame portion 36. The rear frame portion 36 desirably includes a pair of lower legs, or chain stay members 38 (only one shown), extending on each side of the rear wheel 20 from a lower portion of the main frame 34. In addition, the rear frame portion 36 includes a pair of upper legs, or seat stay members 40, extending from an upper portion of the main frame 34 on each side of the rear wheel 20 and being connected to a rear end of the chain stays 38 near a hub axis of the rear wheel 20.

Desirably, at least the main frame 34 is constructed from a plurality of tubular, metal pieces welded together. For example, the main frame 34 may be constructed from aluminum, steel or titanium tubing. Alternatively, the frame may comprise a composite material and may be constructed as a unitary piece. In addition, other suitable materials and/or construction methods may also be used, as will be appreciated by one of skill in the art.

As described above, the seat post assembly 30 preferably is constructed to reduce the amount of vibration passed from the bicycle frame 12 to the seat 32, and thus the rider of the bicycle 10. Additionally, other components of the bicycle 10 may also be constructed to reduce vibration transfer. For example, the front fork assembly 14 may be constructed in a manner similar to the present seat post assembly 30 to reduce the transmission of vibrations from the front wheel 16 to the handlebar assembly 18 and, thus, the rider of the bicycle 10. Such a front fork assembly 14 is described in greater detail in a copending application entitled BICYCLE FRONT FORK ASSEMBLY (U.S. patent application Ser. No. 10/195,830, filed Jul. 12, 2002), which is assigned to the assignee of the present application and is hereby incorporated by reference in its entirety. Furthermore, other components and/or portions of the bicycle 10, such as the chain stays 38 or seat stays 40 of the frame 12, may be similarly arranged to reduce the transmission of vibrations from the wheels 16, 20 to the rider of the bicycle 10, as will be appreciated by one of skill in the art in light of the teachings of the present application.

Figure 2:
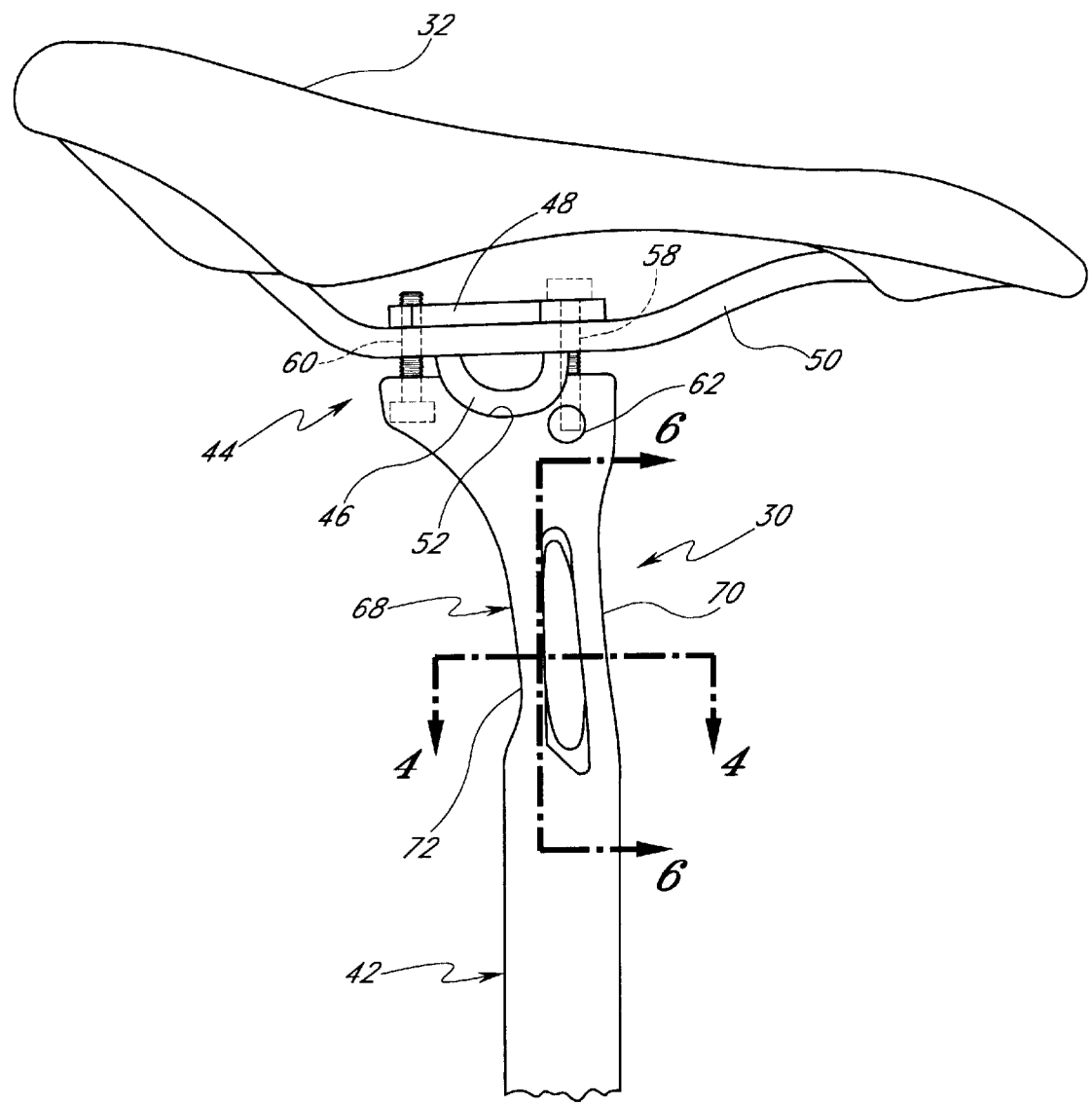
FIG. 2 is a side elevational view of the seat post assembly of FIG. 1.
Figure 3:
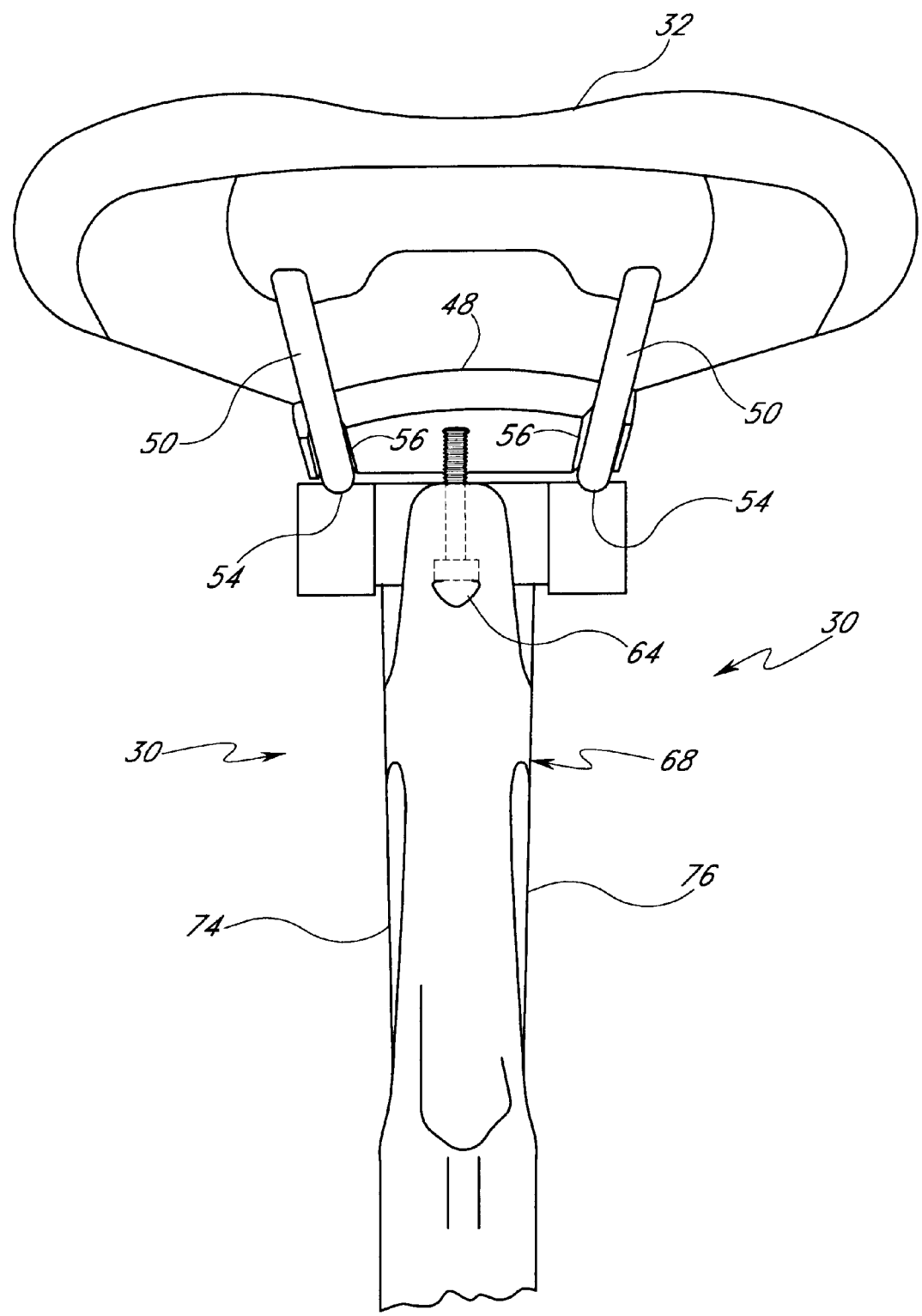
FIG. 3 is a rear view of the seat post assembly of FIG. 1.

With reference to FIGS. 2 and 3, a preferred seat post assembly 30 is illustrated in greater detail. The seat post assembly 30 is primarily comprised of a seat post portion 42 and a seat clamp portion 44. Typically, a lower portion of the seat post portion 42 is inserted into the seat tube 31 of the bicycle frame 12, as described above. The seat post portion 42 may be slid into, or pulled out from, the seat tube 31 to establish a desired height of the bicycle seat 32 relative to the frame 12. The seat clamp assembly 44 desirably sits on top of the seat post portion 42 and is configured to securely hold the seat 32, as well as permitting for and aft and angular adjustment of the seat, as is well known in the art.

The seat clamp assembly 44 desirably includes a lower clamp portion 46 and an upper clamp portion 48, which cooperate to clamp seat rails 50 of the seat 32 therebetween. Preferably, the lower clamp portion 46 is semi-cylindrical in shape and rests within a semi-cylindrical recess 52 defined by an upper surface of the seat post 42. Thus, the lower clamp portion 46 may rotate with respect to the seat post 42 to adjust an angle of the seat 32. Additionally, an upper surface of the lower clamp portion 46 defines a pair of longitudinally extending grooves 54 on each end thereof. The grooves 54 are desirably sized and shaped to receive the seat rails 50 of the seat 32.

Preferably, the upper clamp portion 48 is a substantially flat, plate-like member, which rests on top of the seat rails 50. Desirably, the lower surface of he upper clamp portion 48 defines a pair of channels 56 which are sized and shaped to receive the seat rails 50. Thus, the seat rails 50 are held between the channels 54 of the lower clamp portion 46 and the channels 56 of the upper clamp portion 48. The seat rails 50 may be slid fore and aft within the channels 54, 56 to alter the fore/aft position of the seat 32 with respect to the bicycle frame 12.

Desirably, one or more fastening members are used to apply a clamping force between the upper clamp 48 and the lower clamp portion 46. In the illustrated embodiment, the fastening members comprise front and rear bolts 58, 60, respectively. The front bolt 58 passes downwardly through an aperture of the upper clamp portion 48 and is threaded into an insert 62 held within an upper portion of the seat post 42. A rear bolt 60 preferably passes upwardly through an opening 64 in the rearward portion of the seat post 42 and is threadably engaged with a threaded aperture of the upper seat clamp portion 48. Thus, the front and rear bolts 58 60 may be tightened to apply a clamping force on the seat rails 50 to securely fasten the seat 32 to the seat post assembly 30.

Although the above-described arrangement is preferred for its lightweight and simplicity, other suitable set clamp arrangements may also be used. In addition, it is not necessary that the seat 32 include a pair of seat rails 50. For example, the seat 32 may have a single, centrally located seat rail or other type of member that may be utilized to connect the seat 32 to the seat post assembly 30.

As mentioned above, desirably the seat post portion 42 is constructed as a composite of a plurality of sheets of a carbon fiber material within an epoxy resin matrix, as is well known in the art. Preferably, the seat post portion 42 incorporates a vibration damping member comprised of an elastomeric material. Preferably, the damping member comprises a thermoplastic elastomer, and more preferably a viscoelastomeric material, as is described in greater detail below. As illustrated in FIG. 2, desirably the damping member is substantially triangular in shape when viewed from the side. Such an arrangement advantageously maximizes the contact area between the damping member 66 and the seat post 42 within the space available, which enhances vibration damping, while preserving the strength and stiffness of the seat post 42.

Furthermore, desirably the damping member 66 is substantially solid and, preferably, is completely solid. Such an arrangement advantageously provides consistent, uniform vibration damping performance of the damping member 66. In addition, desirably, the cross-sectional area of the damping member 66 is great enough to effectively dampen vibrations from reaching the rider of the bicycle 10. In the context of a bicycle seat post assembly 30, preferably the cross-sectional area of the largest portion of the damping member 66 is about 35 $mm^2$ and, more preferably, about 65 $mm^2$. However, other cross-sectional dimensions may be desirable to provide a different level of vibration damping or for other applications.

Preferably, the seat post 42 desirably defines a cavity 64 in which a damping member 66 is positioned. Desirably, the damping member 66 is located within an upper portion of the seat post 42 and, preferably, within a reduced cross-section portion 68 of the seat post 42 just below the seat clamp assembly. In the illustrated seat post 42, the reduced cross-section portion 68 is substantially rectangular in shape in horizontal cross-section, while the remainder of the seat post 42 below the reduced cross-section portion 68 is substantially round, which generally comprises an exposed, intermediate portion and a lower portion, which is received within the seat tube 31. Although such an arrangement is preferred, the damping member 66 may alternatively be positioned elsewhere within the seat post 42, such as immediately above the seat tube 31, for example.

With reference to FIG. 2, desirably, both the front surface 70 and rear surface 72 of the seat post 42 curve inwardly at an upper portion to define the reduced cross-section portion 68 and then curve outwardly to define the uppermost end of the seat post 42, which supports the seat clamp assembly 44. Thus, within the reduced cross-section portion 68, a distance between the front surface 70 and the rear surface 72 is less than the distance between the front and rear surfaces 70, 72 within the round portion of the seat post 42 below the reduced cross-section portion 68. Such an arrangement permits limited flexing of the seat post 42 in a longitudinal direction to absorb bumps and improve comfort for the rider of the bicycle 10.

Similarly, with reference to FIG. 3, both the left surface 74 and the right surface 76 of the seat post 42 curve inwardly at an upper portion to define the reduced cross-section portion 68. However, preferably, the right and left surfaces do not curve outwardly again above the reduced cross-section portion 68. Thus, in the illustrated embodiment, a distance between the left surface 74 and the right surface 76 within the reduced cross-section portion 68 is less than the distance between the left and right surfaces 74, 76 within the round portion of the seat post 42 below the reduced cross-section portion 68.

Figure 5:
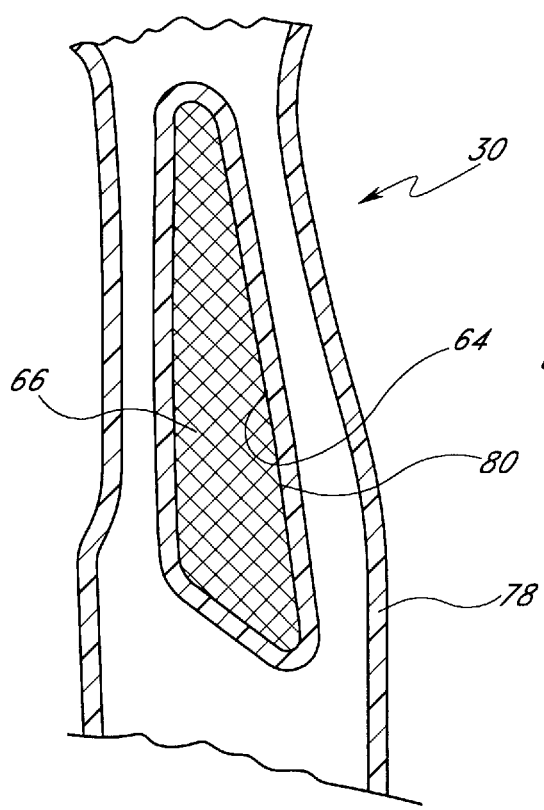
FIG. 5 is a partial sectional view of the seat post assembly of FIG. 1 taken along line 5—5 of FIG. 4.
Figure 6:
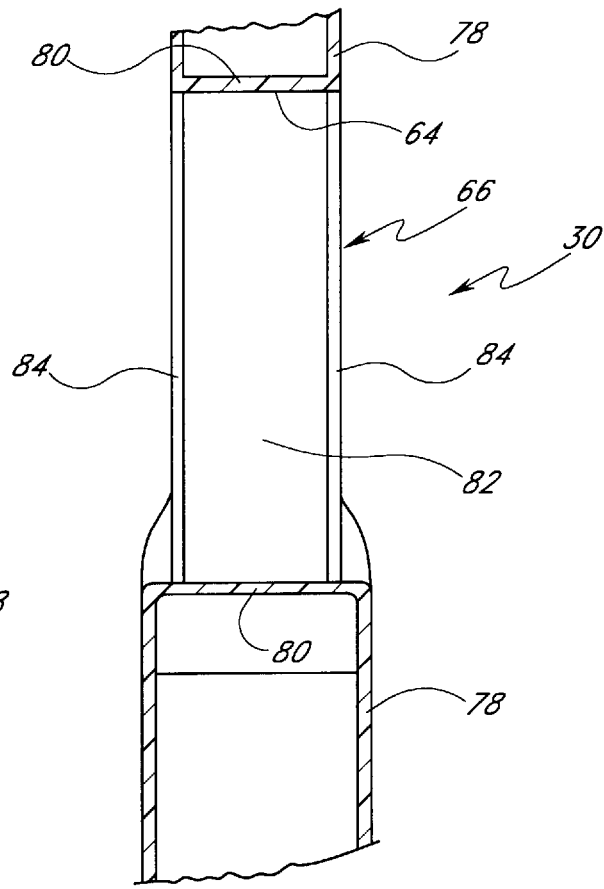
FIG. 6 is a partial sectional view of the seat post assembly of FIG. 1 taken along line 6—6 of FIG. 2.
Figure 4:
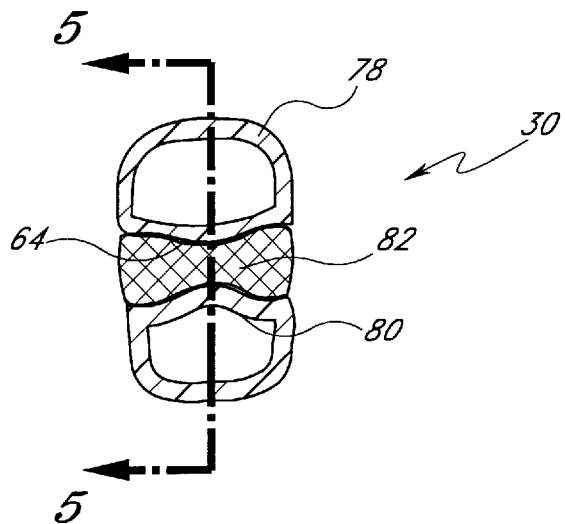
FIG. 4 is a sectional view of the seat post assembly of FIG. 1 taken along line 4—4 of FIG. 2.

With reference to FIGS. 4–6, the seat post assembly 42 is shown in several sectional views. The sectional views, and associated description of the seat post 42 are described with reference to a coordinate system wherein a vertical, longitudinal plane extends along the length of the bicycle 10 and is substantially aligned with a plane defined by the frame 12 and wheels 16, 20. A lateral, or transverse plane is vertically-oriented and substantially normal to the longitudinal plane. A horizontal plane is substantially normal to both the longitudinal and lateral planes.

FIG. 4 is a cross-sectional view of the seat post 42 taken along a horizontal plane and intersecting the damping member 66. FIG. 5 is a partial cross-sectional view of the seat post 42 taken along a vertical, longitudinal plane and intersecting the damping member 66. FIG. 6 is a partial cross-sectional view of the seat post 42 taken along a vertical, transverse plane and aligned with a front surface of the damping member 66.

As illustrated, desirably, the seat post 42 is of a thin wall, hollow construction to be low in weight. Preferably, the seat post 42 is comprised of an outer wall portion 78, which defines an outer surface of the seat post 42 and an internal wall portion 80, which defines the cavity 64, for receiving the damping member 66. Thus, the outer wall portion defines front, rear, left-side and right-side wall portions of the seat post 42. Preferably, the internal wall portion 80 extends from the left side of the outer wall 78 to the right side of the outer wall 78.

Desirably, the outer and internal wall portions 78, 80 are continuous with one another. As described above, desirably, the cavity 64 is substantially triangular in shape and passes completely through the seat post 42 in a lateral direction. Such an arrangement facilitates easy assembly of the damping member 66 into the seat post 42 and also enhances visibility of the damping member 66. However, in other arrangements, the cavity 64 may pass only partially through the seat post 42 and may be fully or partially closed on one, or both, sides.

With reference to FIG. 4, a central portion 82 of the damping member 66 has a reduced thickness in a longitudinal direction such that a forward and rearward surface of the central portion 82 conforms with curved forward and rearward portions of the internal wall 80 of the seat post 42, which defines the cavity 64. That is, preferably, a width of the cavity is reduced in a central portion thereof. Desirably, the cross-section of the damping member 66 is substantially consistent throughout its length. That is, the reduced thickness of the central portion 82 preferably extends substantially the entire length of the damping member 66. Such an arrangement advantageously assists in retaining the damping member 66 within the cavity 64 due to the outer portions of the damping member 66 being larger than the central portion of the cavity 64.

When constructed substantially as described above, the preferred seat post assembly 30 inhibits vibrations from passing therethrough. Thus, vibrations originating at the lower end of the seat post 42 (i.e., at the frame 12) are inhibited from passing to the upper end of the seat post 42 and, thus, the seat 32 of the bicycle 10. Such an arrangement improves the comfort of the rider and reduced fatigue during long rides.

Preferably, the entire seat post assembly 30, with the exception of the damping member 66, is constructed in a manner conventional for composite bicycle components. However, the seat post assembly 30 may be constructed by any other suitable method. Desirably, the damping member 66 is sized slightly larger than the cavity 64 and is retained within the cavity 64 by contact friction therebetween. Preferably, the damping member 66 is sized such that it may be assembled into the seat post assembly 30 by hand. However, the damping member 66 may also be press fit into the cavity 64 using the assistance of a machine, such as a press, for instance.

Although the above-described process is preferred, the damping member 66 may be secured within the cavity 64 by other means as well. For example, an adhesive may be used to create a chemical bond between the contact surfaces of the damping member 66 and the wall 80 defining the cavity 64. In other arrangements, the damping member 66 may be assembled during manufacturing of the seat post 42, such as by co-molding, for example.

Of course, the foregoing description is that of certain features, aspects and advantages of the present invention to which various changes and modifications may be made without departing from the spirit and scope of the present invention. Moreover, a front fork assembly may not feature all objects and advantages discussed above in order to use certain features, aspects and advantages of the present invention. Thus, for example, those skilled in the art will recognize that the invention may be embodied or carried out in a manner that achieves or optimizes one advantage or a group of advantages as taught herein without necessarily achieving other objects or advantages as may be taught or suggested herein. The present invention, therefore, should only be defined by the appended claims.

What is claimed is:

1. A bicycle seat post assembly, comprising:
   a seat clamp portion;
   an elongate, tubular seat post portion having a fixed length and supporting said seat clamp portion on an upper end of said seat post portion, said seat post portion having a lower portion, an upper portion and an intermediate portion, said lower portion configured to be secured to a bicycle frame, a wall of said seat post portion defining an outer wall portion and an internal wall portion, said internal wall portion defining a cavity;
   a damping member positioned within said cavity and contacting said internal wall, said damping member comprising a vibration damping material.

2. The seat post assembly of claim 1, wherein substantially an entire perimeter of said damping member contacts said internal wall.

3. The seat post assembly of claim 2, wherein said damping member is generally rectangular in horizontal cross-section.

4. The seat post assembly of claim 1, wherein said vibration damping material comprises an elastomeric material.

5. The seat post assembly of claim 1, wherein one of a front wall portion and a rear wall portion of said seat post portion adjacent said cavity is curved inwardly toward said cavity.

6. The seat post assembly of claim 5, wherein each of said front wall portion and said rear wall portion of said seat post portion adjacent said cavity is curved inwardly toward said cavity.

7. The seat post assembly of claim 1, wherein said cavity is located in said upper portion.

8. The seat post assembly of claim 7, wherein said upper portion has a smaller cross-sectional dimension in a vertically-oriented, transverse plane than said intermediate portion.

9. The seat post assembly of claim 7, wherein said upper portion has a smaller cross-sectional dimension in a vertical, longitudinal plane than said intermediate portion.

10. The seat post assembly of claim 1, wherein said internal wall comprises a first side and a second side facing said first side, a middle portion of said first side and second side being curved toward one another such that a width of said cavity is reduced in said middle portion, said damping member shaped to substantially conform to said reduced width of said cavity.

11. A bicycle seat post assembly, comprising:
    a seat clamp portion;
    an elongate, tubular seat post portion supporting said seat clamp portion on an upper end of said seat post portion, said seat post portion configured to be secured to a bicycle frame, a wall of said seat post portion defining an outer wall portion and an internal wall portion, said internal wall portion extending from a first side of said outer wall portion to a second side of said outer wall portion opposite said first side and defining a cavity;
    a damping member positioned within said cavity and contacting said internal wall, said damping member comprising a vibration damping material, wherein each of said outer wall portion and said damping member define a portion of an external surface of said seat post assembly.

12. The seat post assembly of claim 11, wherein said seat post portion includes a lower portion, an intermediate portion and an upper portion, said internal cavity being located in said upper portion of said seat post portion.

13. The seat post assembly of claim 11, wherein substantially an entire perimeter of said damping member contacts said internal wall.

14. The seat post assembly of claim 13, wherein said damping member is generally rectangular in horizontal cross-section.

15. The seat post assembly of claim 11, wherein said vibration damping material comprises an elastomeric material.

16. The seat post assembly of claim 11, wherein one of a front wall portion and a rear wall portion of said seat post portion adjacent said cavity is curved inwardly toward said cavity.

17. The seat post assembly of claim 16, wherein each of said front wall portion and said rear wall portion of said seat post portion adjacent said cavity is curved inwardly toward said cavity.

18. The seat post assembly of claim 11, wherein said cavity is located in said upper portion.

19. The seat post assembly of claim 18, wherein said upper portion has a smaller cross-sectional dimension in a vertically-oriented, transverse plane than said intermediate portion.

20. The seat post assembly of claim 18, wherein said upper portion has a smaller cross-sectional dimension in a vertical, longitudinal plane than said intermediate portion.

21. The seat post assembly of claim 11, wherein said internal wall comprises a first side and a second side facing said first side, a middle portion of said first side and second side being curved toward one another such that a width of said cavity is reduced in said middle portion, said damping member shaped to substantially conform to said reduced width of said cavity.

22. A bicycle, comprising:

a frame;

a front wheel and a rear wheel connected to said frame;

a pedal crank assembly rotatably supported by said frame and configured to drive said rear wheel;

a seat post assembly secured to said frame and supporting a seat on an upper end of said seat post assembly, said seat post assembly comprising;

a seat clamp portion;

an elongate, tubular seat post portion having a fixed length and supporting said seat clamp portion on an upper end of said seat post portion, said seat post portion having a lower portion, an upper portion and an intermediate portion, said lower portion secured to said frame, a wall of said seat post portion defining an outer wall portion and an internal wall portion, said internal wall portion extending from a first side of said outer wall portion to a second side of said outer wall portion opposite said first side and defining a cavity;

a damping member positioned within said cavity and contacting said internal wall, said damping member comprising a vibration damping material.

23. The bicycle of claim 22, wherein said internal cavity is located in said upper portion of said seat post.

24. The bicycle of claim 22, wherein substantially an entire perimeter of said damping member contacts said internal wall.

25. The bicycle of claim 24, wherein said damping member is generally rectangular in horizontal cross-section.

26. The bicycle of claim 22, wherein said vibration damping material comprises an elastomeric material.

27. The bicycle of claim 22, wherein one of a front wall portion and a rear wall portion of said seat post portion adjacent said cavity is curved inwardly toward said cavity.

28. The bicycle of claim 27, wherein each of said front wall portion and said rear wall portion of said seat post portion adjacent said cavity is curved inwardly toward said cavity.

29. The bicycle of claim 28, wherein said cavity is located in said upper portion.

30. The bicycle of claim 29, wherein said upper portion has a smaller cross-sectional dimension in a vertically-oriented, transverse plane than said intermediate portion.

31. The bicycle of claim 29, wherein said upper portion has a smaller cross-sectional dimension in a vertical, longitudinal plane than said intermediate portion.

32. The bicycle of claim 22, wherein said internal wall comprises a first side and a second side facing said first side, a middle portion of said first side and second side being curved toward one another such that a width of said cavity is reduced in said middle portion, said damping member shaped to substantially conform to said reduced width of said cavity.

* * * * *